United States Patent [19]

(12) United States Patent
Campbell

(10) Patent No.: US 11,725,528 B1
(45) Date of Patent: Aug. 15, 2023

(54) VANE MULTIPLET WITH COMMON PLATFORM JOINING AIRFOILS

(71) Applicant: RAYTHEON TECHNOLOGIES CORPORATION, Farmington, CT (US)

(72) Inventor: Christian X. Campbell, West Hartford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 17/882,069

(22) Filed: Aug. 5, 2022

(51) Int. Cl.
*F01D 9/04* (2006.01)

(52) U.S. Cl.
CPC .......... *F01D 9/042* (2013.01); *F05D 2220/32* (2013.01); *F05D 2230/60* (2013.01); *F05D 2240/12* (2013.01); *F05D 2300/6033* (2013.01)

(58) Field of Classification Search
CPC ..... F01D 9/00; F01D 9/02; F01D 9/04; F01D 9/041; F01D 9/042; F01D 25/24; F05D 2230/60; F05D 2240/12; F05D 2240/80; F05D 2300/6033; F05D 2220/32
See application file for complete search history.

(56) References Cited

U.S. PATENT DOCUMENTS

| 5,630,700 | A | 5/1997 | Olsen et al. | |
|---|---|---|---|---|
| 8,926,262 | B2* | 1/2015 | Tanahashi | F01D 5/282 416/241 B |
| 11,156,105 | B2 | 10/2021 | White, III | |
| 11,193,393 | B2 | 12/2021 | Whittle et al. | |
| 11,319,822 | B2 | 5/2022 | Freeman et al. | |
| 2002/0127097 | A1* | 9/2002 | Darolia | F01D 5/3084 415/137 |
| 2012/0057985 | A1* | 3/2012 | Tanahashi | F01D 5/282 416/241 B |
| 2015/0016972 | A1* | 1/2015 | Freeman | C04B 37/005 415/177 |
| 2019/0063246 | A1* | 2/2019 | Frey | F01D 25/005 |
| 2020/0040750 | A1* | 2/2020 | Greene | F01D 11/005 |

* cited by examiner

*Primary Examiner* — Woody A Lee, Jr.
*Assistant Examiner* — Elton K Wong
(74) *Attorney, Agent, or Firm* — Carlson, Gaskey & Olds, P.C.

(57) ABSTRACT

A vane multiplet includes a plurality of airfoils that each have a flared end, a common platform piece, a plurality of seal, and a plurality of retainers. The common platform has airfoil sockets that each define an airfoil opening that is circumscribed by a groove. The flared ends of the airfoils are seated in the airfoil sockets such that the grooves and the airfoils together form seal channels that have an open side. The seals are disposed in the seal channels. The retainers have airfoil-shaped profiles and are disposed in the airfoil sockets to bound the open sides of the seal channels and retain the seal in the seal channel.

17 Claims, 5 Drawing Sheets

VANE MULTIPLET WITH COMMON PLATFORM JOINING AIRFOILS

BACKGROUND

A gas turbine engine typically includes a fan section, a compressor section, a combustor section and a turbine section. Air entering the compressor section is compressed and delivered into the combustion section where it is mixed with fuel and ignited to generate a high-pressure and temperature exhaust gas flow. The high-pressure and temperature exhaust gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic matrix composite ("CMC") materials are also being considered for airfoils. Among other attractive properties, CMCs have high temperature resistance. Despite this attribute, however, there are unique challenges to implementing CMCs in airfoils.

SUMMARY

A vane multiplet according to an example of the present disclosure includes a plurality of airfoils. Each of the airfoils have a flared end. A common platform piece has airfoil sockets. Each of the airfoil sockets define an airfoil opening circumscribed by a groove. The flared end of each of the airfoils seat in one of the airfoil sockets such that the groove and the airfoil together form a seal channel with an open side. A plurality of seals is disposed in one of the seal channels. A plurality of retainers has airfoil-shaped profiles. Each of the retainers are disposed in one of the airfoil sockets and bounding the open side of one of the seal channels to retain the seal in the seal channel.

In a further embodiment of any of the foregoing embodiments, the airfoils, the common platform piece, and the retainers are formed from ceramic matrix composite material.

In a further embodiment of any of the foregoing embodiments, the seals are rope seals.

In a further embodiment of any of the foregoing embodiments, each of the flared ends defines an edge, and the edge and the groove together define the seal channel with the open side.

In a further embodiment of any of the foregoing embodiments, the common platform includes an endwall and the airfoil sockets are upstanding collars that project from the endwall.

A further embodiment of any of the foregoing embodiments includes a lock ring that secures the retainers in the sockets.

In a further embodiment of any of the foregoing embodiments, the lock ring is segmented.

In a further embodiment of any of the foregoing embodiments, the lock ring is a full hoop.

In a further embodiment of any of the foregoing embodiments, the lock ring includes projecting lock tabs that extend into the airfoil sockets and limit radial and circumferential movement of the retainers.

A further embodiment of any of the foregoing embodiments includes comprising a plurality of spars, each of the spars extends through one of the airfoil sockets, extends through one of the airfoils, and secures one of the retainers in the socket.

In a further embodiment of any of the foregoing embodiments, the retainers are carried on the spars.

A gas turbine engine according to an example of the present disclosure includes a compressor section, a combustor in fluid communication with the compressor section, and a turbine section in fluid communication with the combustor. The turbine section has vane multiplets disposed about a central axis of the gas turbine engine. Each of the vane multiplets have a plurality of airfoils. Each of the airfoils have a flared end, and a common platform piece having airfoil sockets. Each of the airfoil sockets define an airfoil opening circumscribed by a groove. The flared end of each of the airfoils seat in one of the airfoil sockets such that the groove and the airfoil together form a seal channel with an open side. A plurality of seals is disposed in one of the seal channels, and a plurality of retainers has airfoil-shaped profiles. Each of the retainers are disposed in one of the airfoil sockets and bounding the open side of one of the seal channels to retain the seal in the seal channel.

In a further embodiment of any of the foregoing embodiments, the airfoils, the common platform piece, and the retainers are formed from ceramic matrix composite material.

In a further embodiment of any of the foregoing embodiments, the seals are rope seals.

In a further embodiment of any of the foregoing embodiments, each of the flared ends defines an edge, and the edge and the groove together define the seal channel with the open side.

In a further embodiment of any of the foregoing embodiments, the common platform includes an endwall and the airfoil sockets are upstanding collars that project from the endwall.

A further embodiment of any of the foregoing embodiments includes a lock ring that secures the retainers in the sockets.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

In this disclosure, like reference numerals designate like elements where appropriate and reference numerals with the addition of one-hundred or multiples thereof designate modified elements that are understood to incorporate the same features and benefits of the corresponding elements.

DETAILED DESCRIPTION

Figure 1:
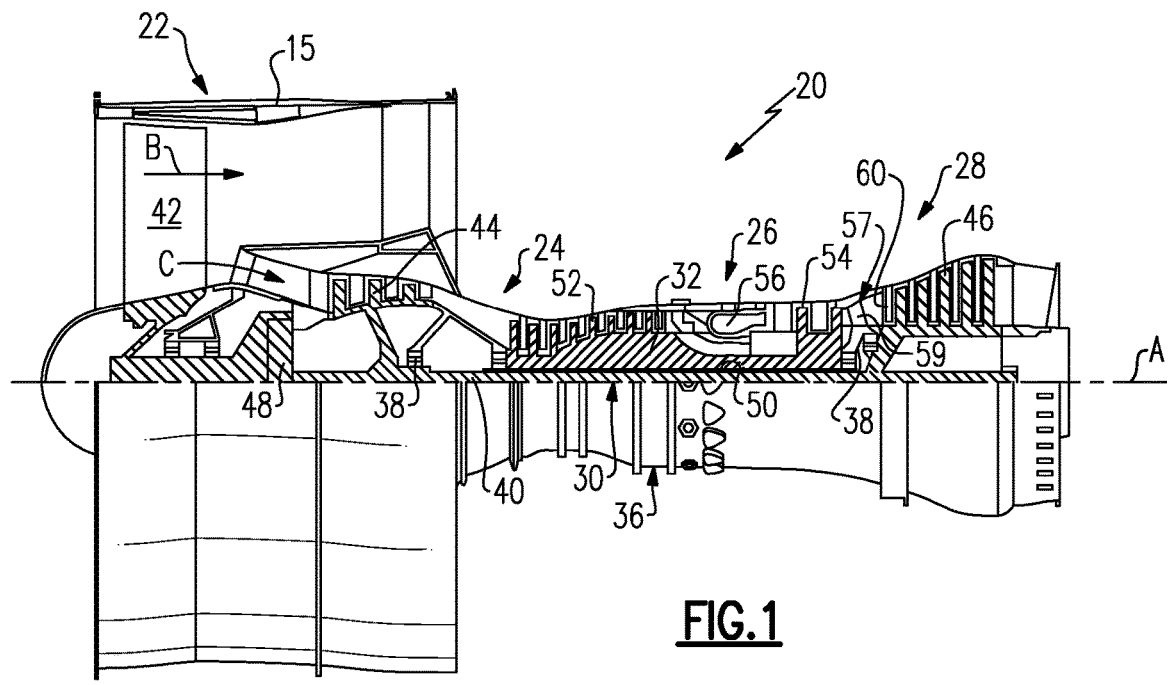
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 incudes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Vanes in a turbine section of a gas turbine engine are often provided as arc segment singlets that are arranged in a circumferential row. Each arc segment singlet has one airfoil section attached between an outer platform and an inner platform. There are gaps between adjacent mating platforms in the row through which core gas flow can leak, thereby debiting engine performance Thin metal strips, known as feather seals, may be used to seal the mateface gaps. Despite these feather seals, however, there can still be a significant amount of leakage. Metallic vanes can be cast as arc segment multiplets that have two or more airfoil sections that are attached with a common platform (e.g., a common outer platform, or between a common outer platform and a common inner platform). This mitigates leakage by eliminating some of the mateface gaps. However, where casting cannot be used, such as for ceramic matrix composite (CMC) structures, there has been considerable difficulty in making multiplets that can also meet structural performance goals. The examples set forth herein below disclose CMC vane multiplets to address one or more of the above concerns.

Figure 2:
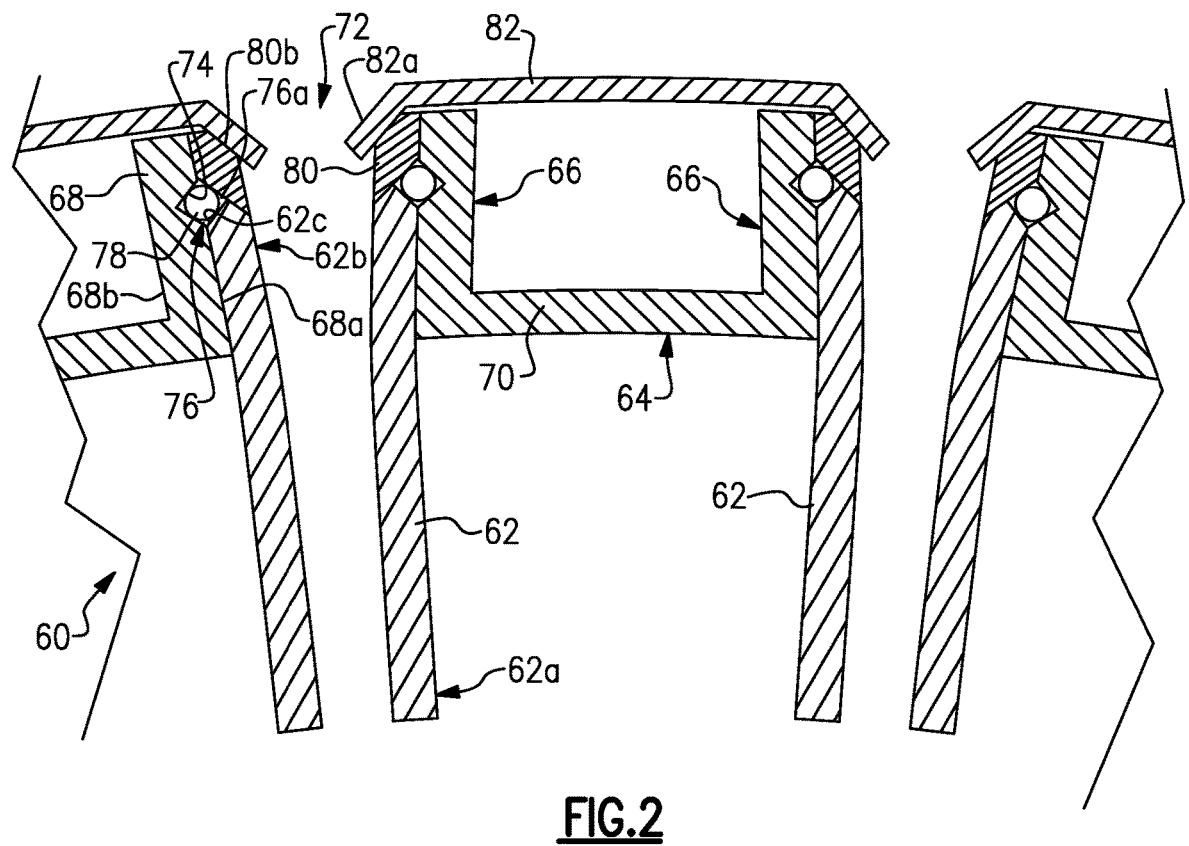
FIG. 2 illustrates a sectioned view of a vane multiplet.

FIG. 2 illustrates a sectioned view (looking axially) of a representative portion of an example of a vane multiplet 60 (arc segment). The vane multiplet 60 has a plurality of airfoils 62. Each airfoil 62 is hollow and extends in a radial direction between a radially inner end 62a and a radially outer, flared end 62b. For instance, the outer surface of the walls of the airfoil 62 at the flared end 62b form an angle of approximately 2° to 10° with the radial direction. In one further example, the angle is approximately 5°. The airfoils 62 are platform-less in that, at least initially, they only contain an airfoil section and no endwalls. The airfoils 62 are thus relatively simple in geometry in comparison to vanes that have airfoils and platforms formed together as one piece, which facilitates manufacturing of the airfoils 62. The airfoils 62 may also be coated or undergo other processing steps prior to assembly into the vane multiplet 60, thus isolating the manufacture of the airfoils 62 from the other components of the vane multiplet 60.

Figure 3:
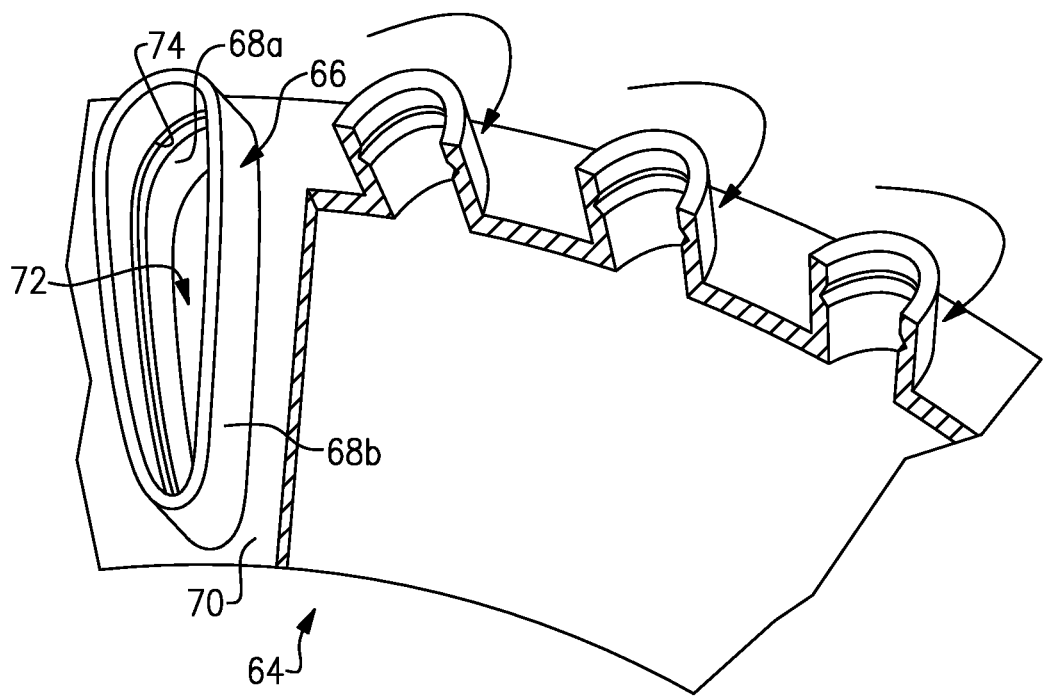
FIG. 3 illustrates a common platform piece of the vane multiplet.

A common platform piece 64 joins the airfoils 62 together. Although not shown, each vane 62 may have a radially inner platform opposite the common platform piece 64. FIG. 3 shows an isolated, partially sectioned view of the common platform piece 64. The common platform piece 64 has airfoil sockets 66. In the example of FIG. 3, the common platform piece 64 has four airfoil sockets 66 (two shown in FIG. 2), although it is to be understood that it could alternatively have two, three, or more than four sockets 66. In FIG. 3, and later in FIGS. 9A, 9B, 9C, and 9D, the common platform piece 64 is sectioned such that only the leading end portions of some of the sockets 66 are shown. It is to be understood, however, that each socket 66 has an airfoil-shaped profile.

Each of the airfoil sockets 66 has an upstanding collar 68 that projects radially from an endwall portion 70 of the common platform piece 64 and that defines an airfoil opening 72. The walls of the upstanding collars 68 include inner and outer surfaces 68a/68b. The inner surface 68a bounds the opening 72, which tapers inwards along the radial direction. Each socket 66 has a groove 74 that circumscribes the opening 72. In the example shown, the groove is a V-shaped groove, but it could alternatively be square, circular, or other cross-sectional shape. The walls of the collars 68 and the endwall portion 70 form a truss structure that provides strength for bearing aerodynamic and other loads. In this regard, as long as there is available radial space, the radial heights of the collars 68 may be selected to tailor the load-carrying capability of the common platform piece 64.

The flared ends 62b of the airfoils seat in the sockets 66. For example, the inner surface 68a of the wall of the collar 68 slopes at an angle that corresponds (e.g., is equal to) to the angle of the flared end 62b of the airfoil 62 such that the sides of the airfoil 62 bear against the inner surface 68a, thereby locking the airfoils 62 into the sockets 66. In the fully seated position as shown, an edge 62c of the airfoil 62 is situated adjacent the groove 74 such that the groove 74 and the airfoil 62 together form a seal channel 76. The groove 74 and the edge 62c, however, do not completely bound the seal channel 76 and there is thus an open side 76a of the channel 76.

There is a seal 78 disposed in each of the seal channels 76, which functions to reduce core gas flow leakage between the airfoils 62 and the common platform piece 64. The seating of the airfoil 62 against the surface 68a may also provide additional sealing. In one example, the seals 78 are rope seals that are deformable under applied loads. The seals 78 may be segmented or may be endless loops. The rope seals are formed of high-temperature resistance fibers, such as ceramic fibers. The fibers may be braided, knitted, or woven. Example ceramic fibers include, but are not limited to, oxide fibers. For instance, the ceramic fibers are NEXTEL fibers, which are composed of $Al_2O_3$, $SiO_2$, and $B_2O_3$. Optionally, the rope seals may include a sheath surrounding a fiber core. The sheath can be an overbraid or foil that surrounds the core. The seals 78 are not limited to rope seals and may alternatively be a spring seal or other type of seal that can be trapped in the seal channel 76.

Figure 5:
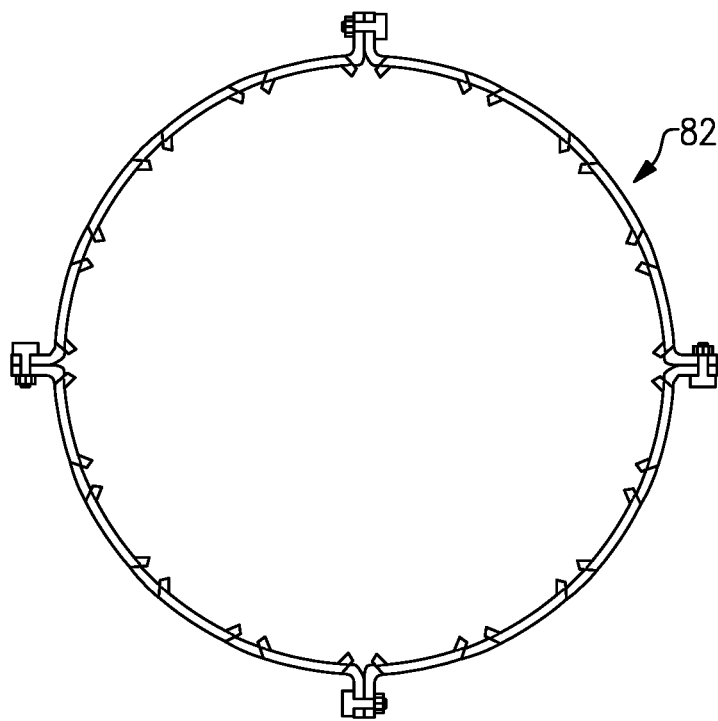
FIG. 5 illustrates a lock ring of the vane multiplet.
Figure 4:
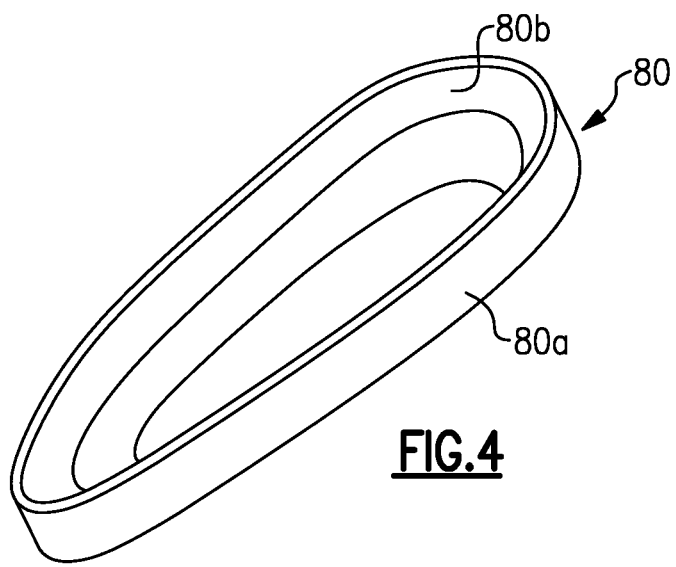
FIG. 4, illustrates a retainer of the vane multiplet.

The vane multiplet 60 further includes a plurality of retainers 80, one of which is shown in isolated view in FIG. 4. Each retainer 80 has an airfoil-shaped profile 80a, which generally matches the profile of the inner surface 68a of the socket 66 so as to fit into the socket 66. Each retainer 80 is disposed in one of the sockets 66 and bounds the open side 76a of the seal channel 76 to thereby compress and trap the seal 78 in the seal channel 76. A lock ring 82 secures the retainers 80 in the sockets 66. For example, the lock ring 82 includes projecting lock tabs 82a that extend into the sockets 66 and limit radial and circumferential movement of the retainers 80. Likewise, the projecting lock tabs 82a also have an airfoil profile, which enables the tabs 82a to fit closely with a sloped face 80b on the retainer 80. An example of a lock ring 82 is shown in an isolated view in FIG. 5, which may be affixed to an engine case. As shown, the lock ring 82 is segmented (four segments shown, but fewer or additional segments may be used). In this example, the segments are secured together by fasteners, although the segments need not be connected to each other.

Figure 6:
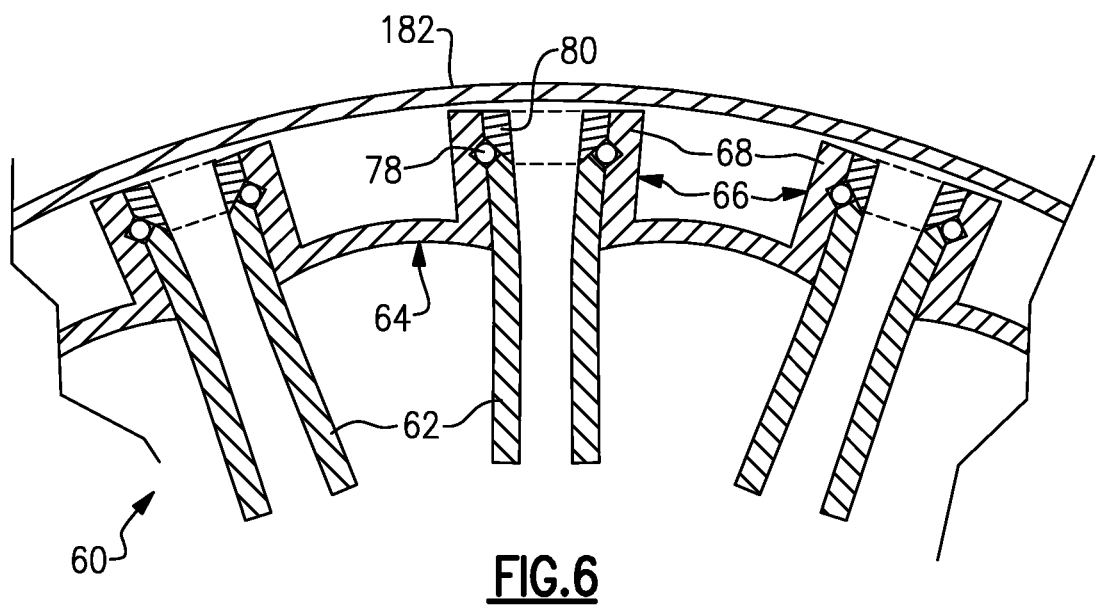
FIG. 6 illustrates another example of a vane multiplet.

The segments of the lock ring 82 are necessary due to the projecting lock tabs 82a, which must be inserted radially into the sockets 66. However, in a modified example shown in FIG. 6, the lock ring 182 is a full hoop and does not include the projecting lock tabs 82a. In this case, the radial height of the retainers 80 is such that the radially outer edges of the retainers 80 are substantially flush with the radially outer faces of the collars 68, or even slightly protruding out from the collars 68. The lock ring 182 then traps the retainers 80 in the sockets 66 and may bias the retainers 80 toward the seals 78 to compress the seals 78. A compressive fit is desired to lock the vane multiplet 60 together set the seals 78. For instance, there are several techniques for installing a full hoop lock ring 182 over the remainder of the assembly with a compressive fit, including but not limited to, tapered ring with force fit, thermal fit wherein the ring is heated, spring compressive load an inner ring assembly mechanically using a tool prior to inserting outer ring, use of compressed expanding seals (e.g., a rope seal or spring seal compressed with wax or other fugitive material that is then burned off after assembly).

Figure 7:
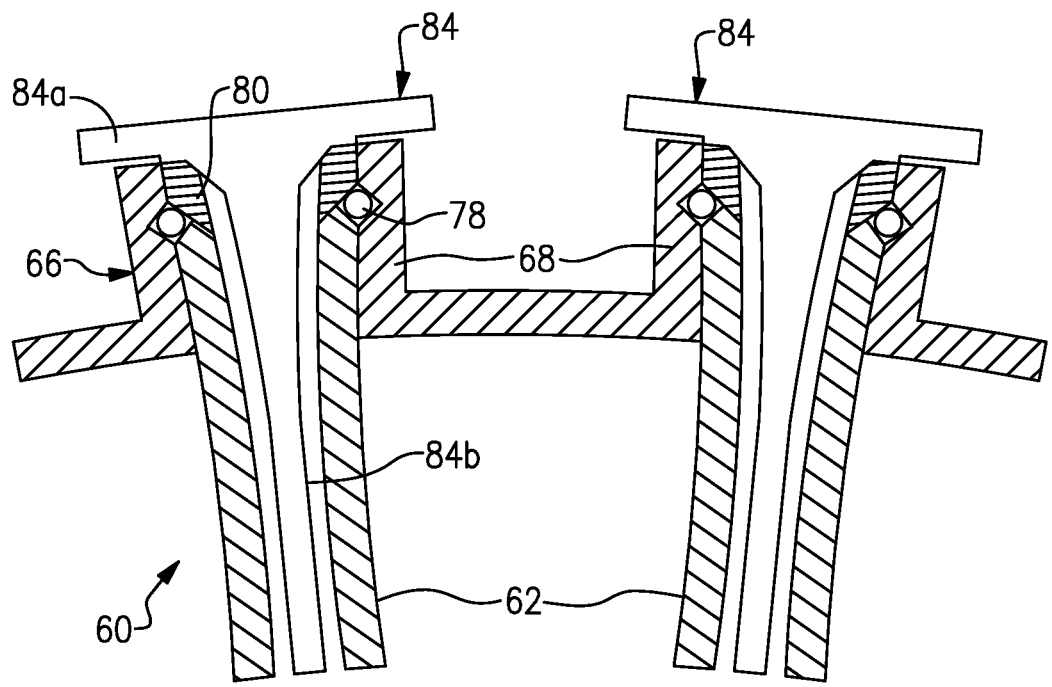
FIG. 7 illustrates another example of a vane multiplet in which, instead of a lock ring, spars secure the retainers in the sockets.

FIG. 7 illustrates another example in which, instead of the lock ring 82, spars 84 secure the retainers 80 in the sockets 66. For instance, each spar 84 includes a spar platform 84a and a spar leg 84b that extends from the spar platform 84a. The spars 84 may alternatively be bolts in which the spar platform 84a is a shoulder. The spar leg 84b extends through the socket 66 and through one of the airfoils 62. The radially inner end of the spar leg 84b opposite the spar platform 84a may be secured to a support structure, such as an inner platform, which acts to secure the retainer 80 in the socket 66. In this regard, the spar 84 may be pre-tensioned to maintain the vane multiplet 60 in compression. The spar platform 84a may be stand-alone or affixed to an engine case.

Figure 8:
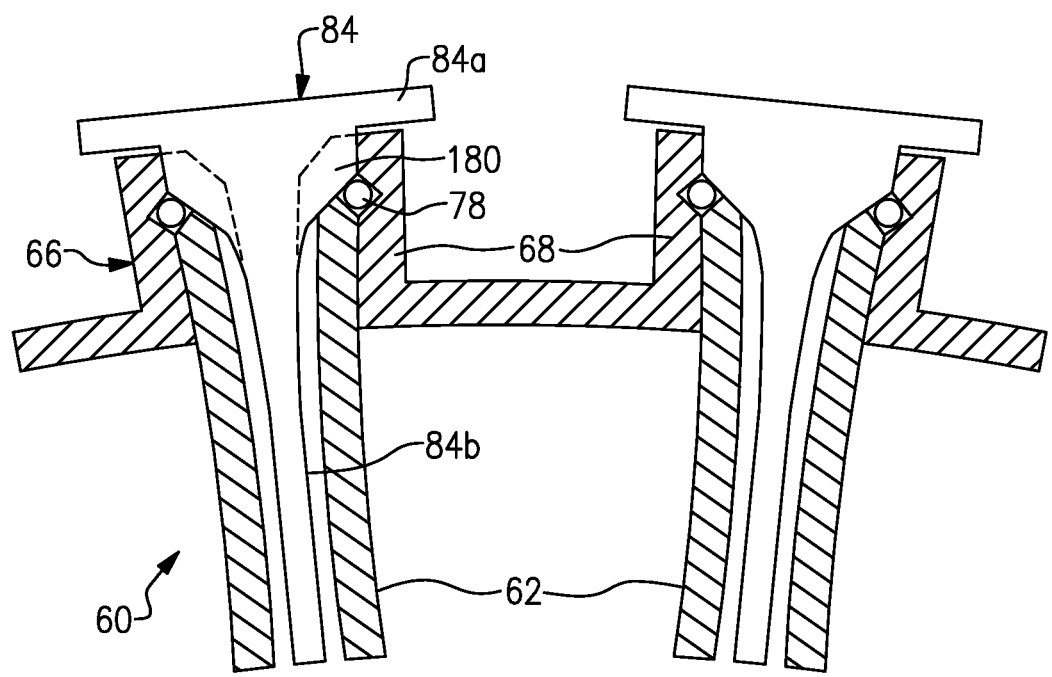
FIG. 8 illustrates another example in which the retainers are carried on the spars.

In a further example shown in FIG. 8, retainers 180 are carried on the spars 84. For example, the retainers 180 are integrated into the spar 84 such that the spar platform 84a, leg 84b, and retainer 180 are a one-piece structure.

At least the airfoils 62, the common platform piece 64, and the lock ring 82 are formed of CMC material. A CMC material is comprised of one or more ceramic fiber plies in a ceramic matrix. Example ceramic matrices are silicon-containing ceramic, such as but not limited to, a silicon carbide (SiC) matrix or a silicon nitride (Si3N4) matrix. Example ceramic reinforcement of the CMC are silicon-containing ceramic fibers, such as but not limited to, silicon carbide (SiC) fiber or silicon nitride (Si3N4) fibers. The CMC may be, but is not limited to, a SiC/SiC ceramic matrix composite in which SiC fiber plies are disposed within a SiC matrix. A fiber ply has a fiber architecture, which refers to an ordered arrangement of the fiber tows relative to one another, such as a 2D woven ply or a 3D structure. The retainers 80 may also be made of CMC material, or alternatively may be formed of a monolithic ceramic. A monolithic ceramic does not contain fibers or reinforcement and is formed of a single material. Example monolithic ceramics include silicon-containing ceramics, such as silicon carbide (SiC) or silicon nitride (Si3N4). The spar 84 may be formed of a metallic alloy, such as a nickel- or cobalt-based super-alloy.

Figure 9A:
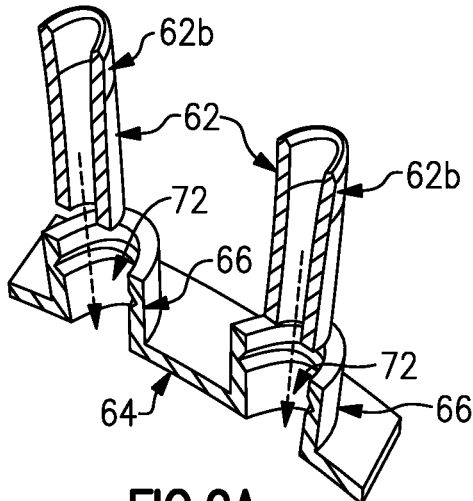
FIGS. 9A, 9B, 9C, and 9D illustrate assembly of a vane multiplet.
Figure 9B:
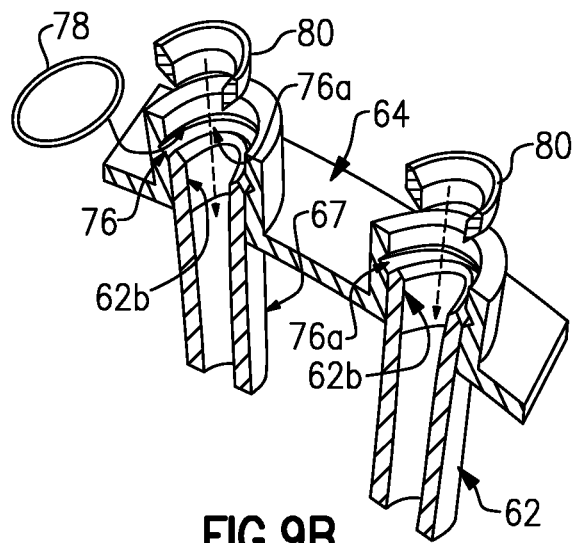
Figure 9C:
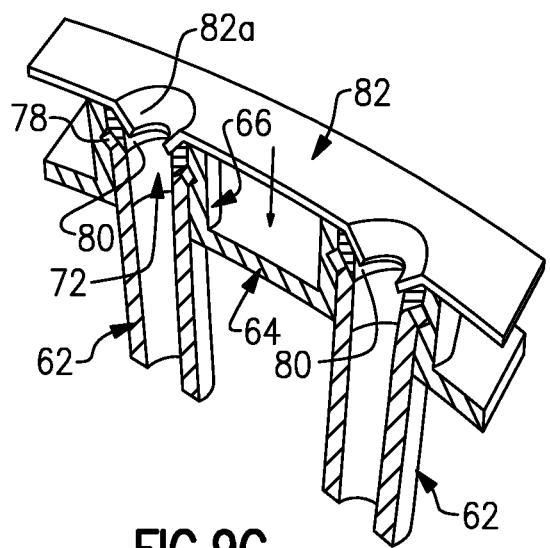
Figure 9D:
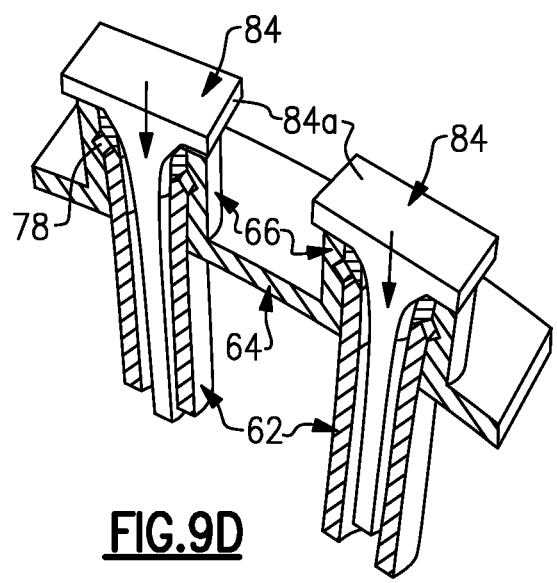

FIGS. 9A to 9D depict assembly of the vane multiplet 60. Initially, the common platform piece 64 and the airfoils 62 are separate pieces. The airfoils 62 are then inserted through the airfoil openings 72 in the sockets 66. The flared ends 62 seat in the sockets 66 and prevent the airfoils 62 from moving entirely through the openings 72. Next, as shown in FIG. 9B, the seals 78 are installed into the seal channels 76, followed by insertion of the retainers 80 to close the open side 76a of the channels 76 and thereby trap the seals 78. As shown in FIG. 9C, the lock ring 82 is then installed over the retainer 80 such that the tabs 84a extends into the sockets 66 to trap the retainers 80 in the sockets 66. Alternatively, if spars 84 are used, the spar legs 84b are inserted through the sockets 66 and airfoils 62, as shown in FIG. 9D, to trap the retainers 80 (or to also install the retainers 180 if integrated into the spars 84).

The vane multiplet 60, in comparison to a vane singlet, has a mechanical advantage in carrying airfoil pressure loads by cross-corner loading on the vane platforms with a wheelbase that is limited to the size of the vane. Unlike a singlet, the vane multiplet 60 shares loads through the common platform piece 64. The effective wheelbase is thus much larger than for a singlet, thereby facilitating a reduction in stress.

The vane multiplet 60 also facilitates reductions in thermal stresses. For example, for vanes that are integrally manufactured to be a single rigid structure, there can be high thermal stresses due to large temperature gradients and thermal mismatches between hot and cold portions of the vane. The airfoils 62, common platform piece 64 and retainers 80 are not rigidly secured together, thus enabling these components to shift or slide at the interfaces to relieve thermal strain.

The vane multiplet 60 also facilitates improved sealing in comparison to vane singlets. For example, the seals 78 seal around the full perimeters of the airfoils 62. Moreover, if the components are made to high tolerances, the seals 78 can be held in tight compression within the seal channels 76.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A vane multiplet comprising:
a plurality of airfoils, each of the airfoils having a flared end;
a common platform piece having airfoil sockets, each of the airfoil sockets defining an airfoil opening circumscribed by a groove, the flared end of each of the airfoils seating in one of the airfoil sockets such that the groove and the airfoil together form a seal channel with an open side;
a plurality of seals, each of the seals being disposed in one of the seal channels; and
a plurality of retainers having airfoil-shaped profiles, each of the retainers being disposed in one of the airfoil sockets and bounding the open side of one of the seal channels to retain the seal in the seal channel.

2. The vane multiplet as recited in claim 1, wherein the airfoils, the common platform piece, and the retainers are formed from ceramic matrix composite material.

3. The vane multiplet as recited in claim 1, wherein the seals are rope seals.

4. The vane multiplet as recited in claim 1, wherein each of the flared ends defines an edge, and the edge and the groove together define the seal channel with the open side.

5. The vane multiplet as recited in claim 1, wherein the common platform includes an endwall and the airfoil sockets are upstanding collars that project from the endwall.

6. The vane multiplet as recited in claim 1, further comprising a lock ring that secures the retainers in the sockets.

7. The vane multiplet as recited in claim 6, wherein the lock ring is segmented.

8. The vane multiplet as recited in claim 6, wherein the lock ring is a full hoop.

9. The vane multiplet as recited in claim 6, wherein the lock ring includes projecting lock tabs that extend into the airfoil sockets and limit radial and circumferential movement of the retainers.

10. The vane multiplet as recited in claim 1, further comprising a plurality of spars, each of the spars extends through one of the airfoil sockets, extends through one of the airfoils, and secures one of the retainers in the socket.

11. The vane multiplet as recited in claim 10, wherein the retainers are carried on the spars.

12. A gas turbine engine comprising:
a compressor section;
a combustor in fluid communication with the compressor section; and
a turbine section in fluid communication with the combustor, the turbine section having vane multiplets disposed about a central axis of the gas turbine engine, each of the vane multiplets includes:
a plurality of airfoils, each of the airfoils having a flared end, a common platform piece having airfoil sockets, each of the airfoil sockets defining an airfoil opening circumscribed by a groove, the flared end of each of the airfoils seating in one of the airfoil sockets such that the groove and the airfoil together form a seal channel with an open side, a plurality of seals, each of the seals being disposed in one of the seal channels, and a plurality of retainers having airfoil-shaped profiles, each of the retainers being disposed in one of the airfoil sockets and bounding the open side of one of the seal channels to retain the seal in the seal channel.

13. The gas turbine engine as recited in claim 12, wherein the airfoils, the common platform piece, and the retainers are formed from ceramic matrix composite material.

14. The gas turbine engine as recited in claim 12, wherein the seals are rope seals.

15. The gas turbine engine as recited in claim 12, wherein each of the flared ends defines an edge, and the edge and the groove together define the seal channel with the open side.

16. The gas turbine engine as recited in claim 12, wherein the common platform includes an endwall and the airfoil sockets are upstanding collars that project from the endwall.

17. The gas turbine engine as recited in claim 12, further comprising a lock ring that secures the retainers in the sockets.

* * * * *